Figure 1:
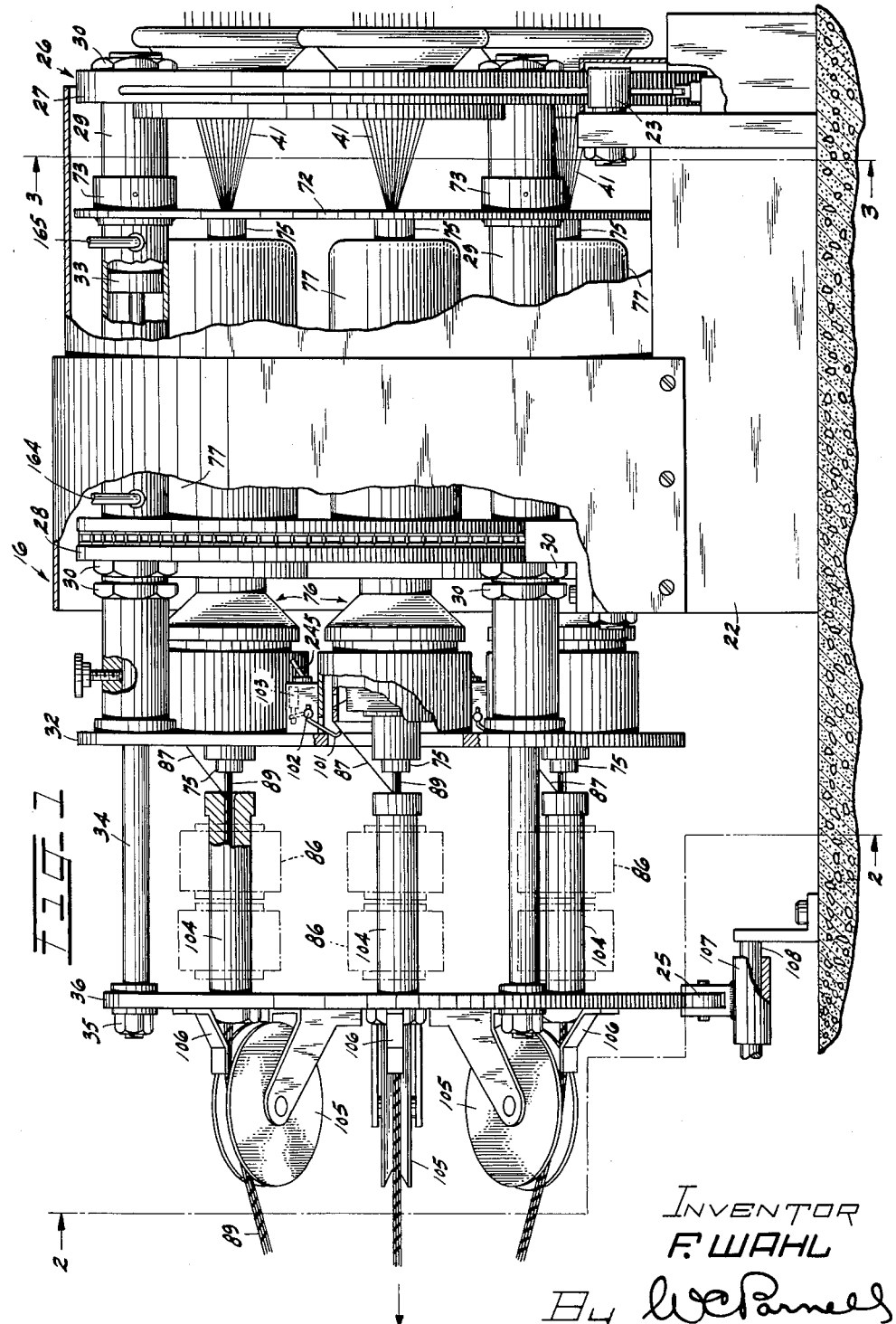

May 22, 1962 F. WAHL 3,035,394
CONTROL SWITCHES FOR MULTI-UNIT BINDER
Original Filed Jan. 30, 1959 8 Sheets-Sheet 1

INVENTOR
F. WAHL
By W.C. Parnell
ATTORNEY

May 22, 1962 F. WAHL 3,035,394
CONTROL SWITCHES FOR MULTI-UNIT BINDER
Original Filed Jan. 30, 1959 8 Sheets-Sheet 3

INVENTOR
F. WAHL
By W.C. Parnell
ATTORNEY

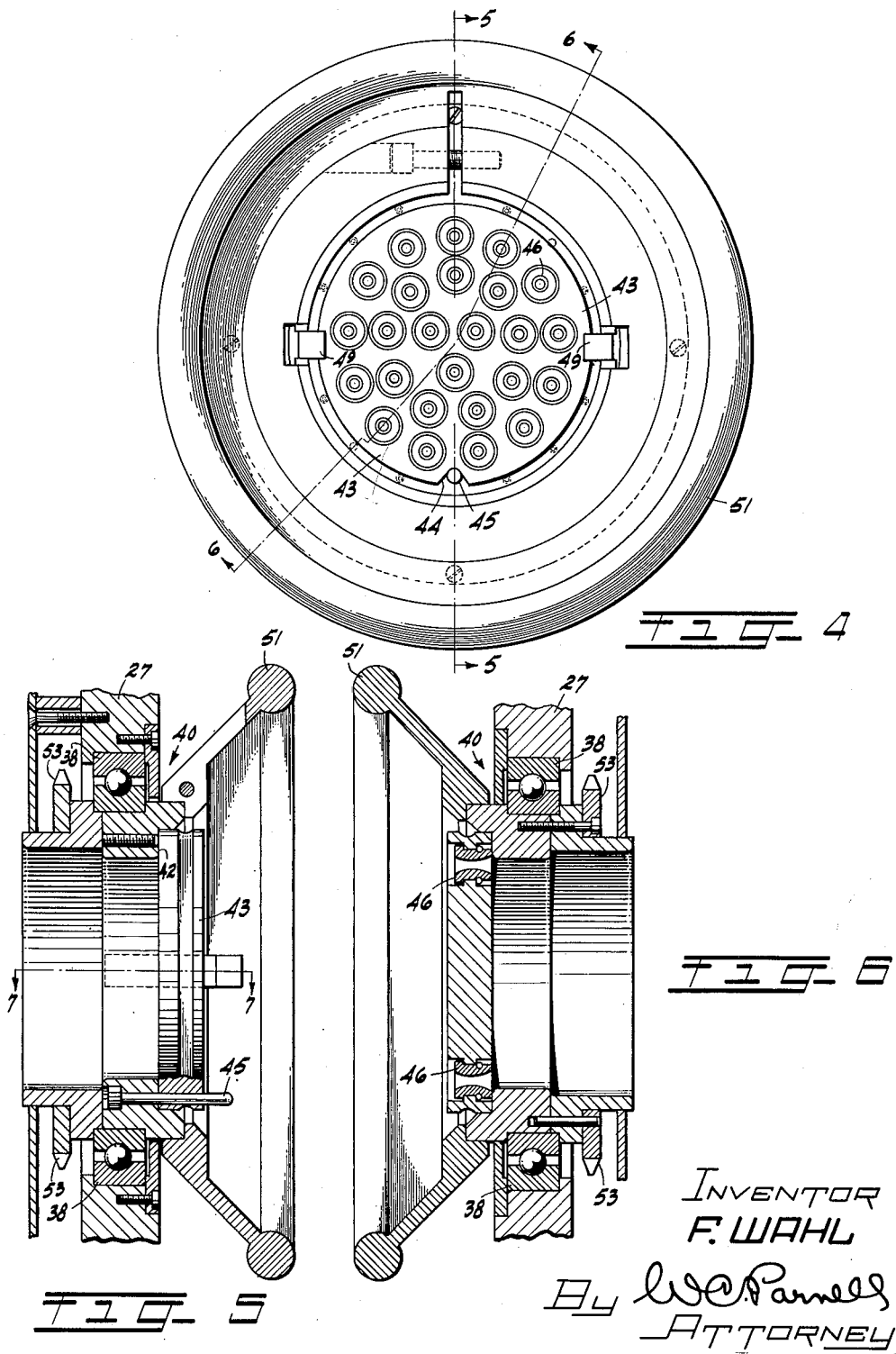

May 22, 1962 F. WAHL 3,035,394
CONTROL SWITCHES FOR MULTI-UNIT BINDER
Original Filed Jan. 30, 1959 8 Sheets-Sheet 5
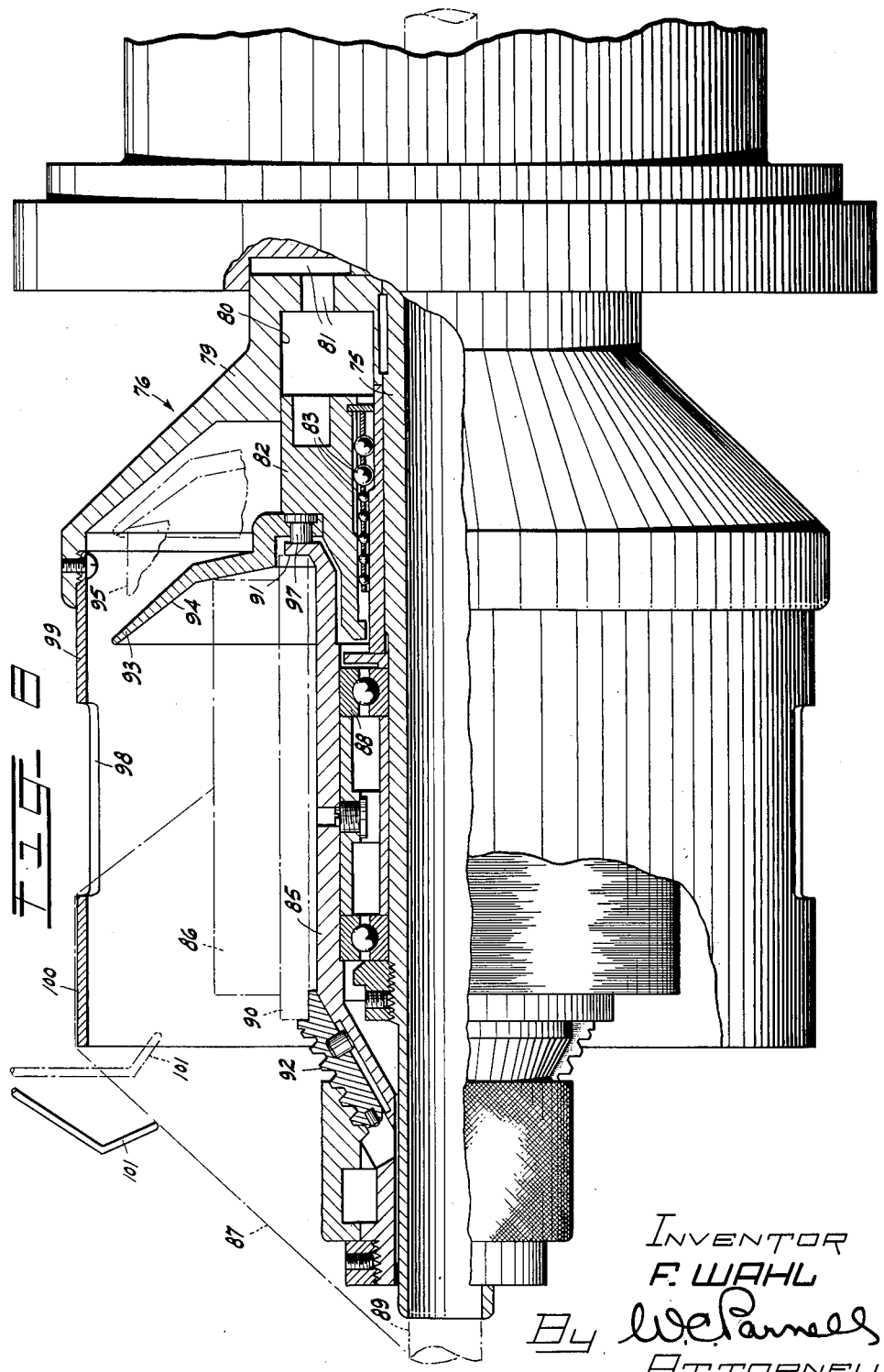
INVENTOR
F. WAHL
By W.C. Parnell
ATTORNEY

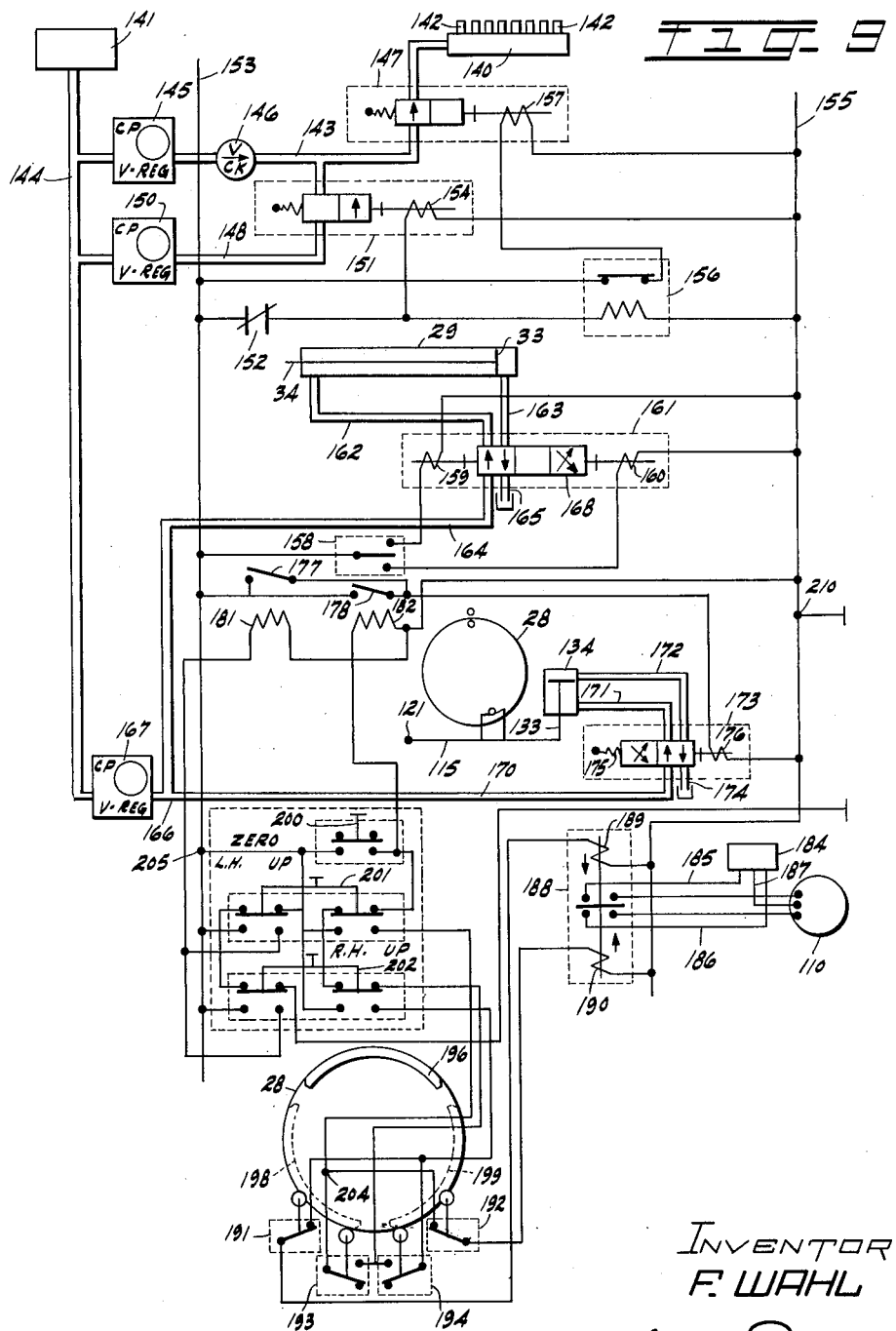

May 22, 1962 F. WAHL 3,035,394
CONTROL SWITCHES FOR MULTI-UNIT BINDER
Original Filed Jan. 30, 1959 8 Sheets-Sheet 7
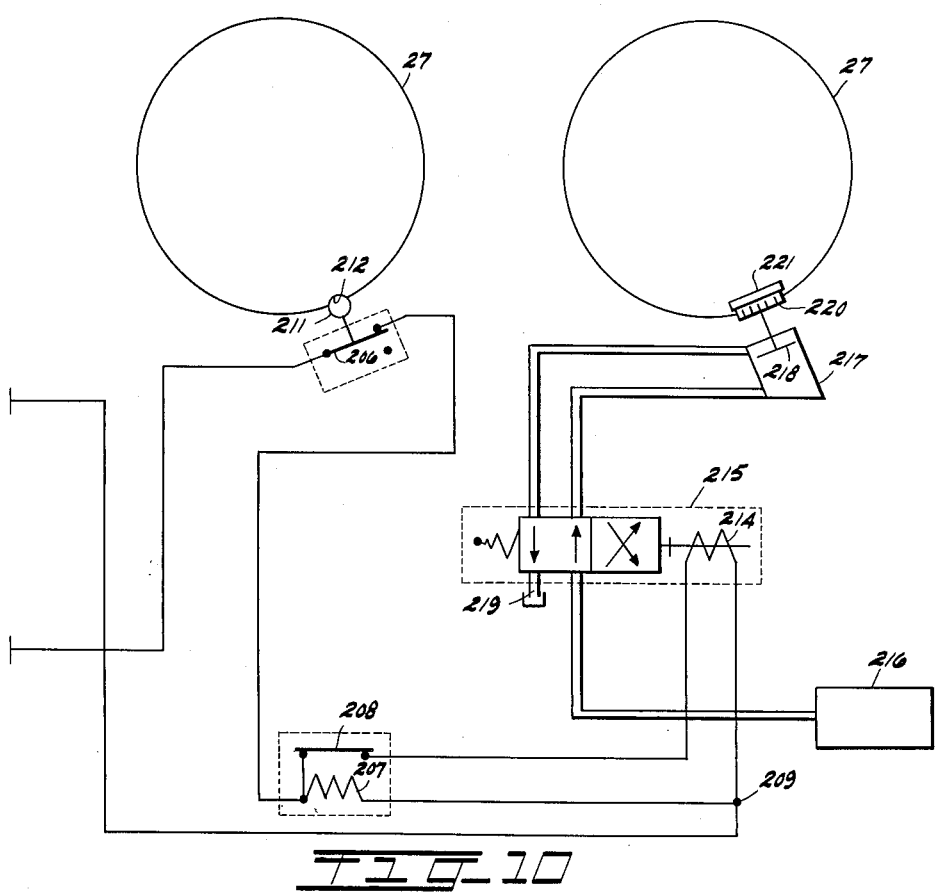
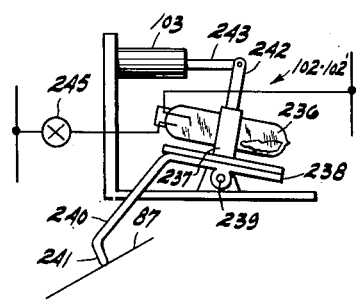
INVENTOR
F. WAHL
By W.C.Parnell
ATTORNEY

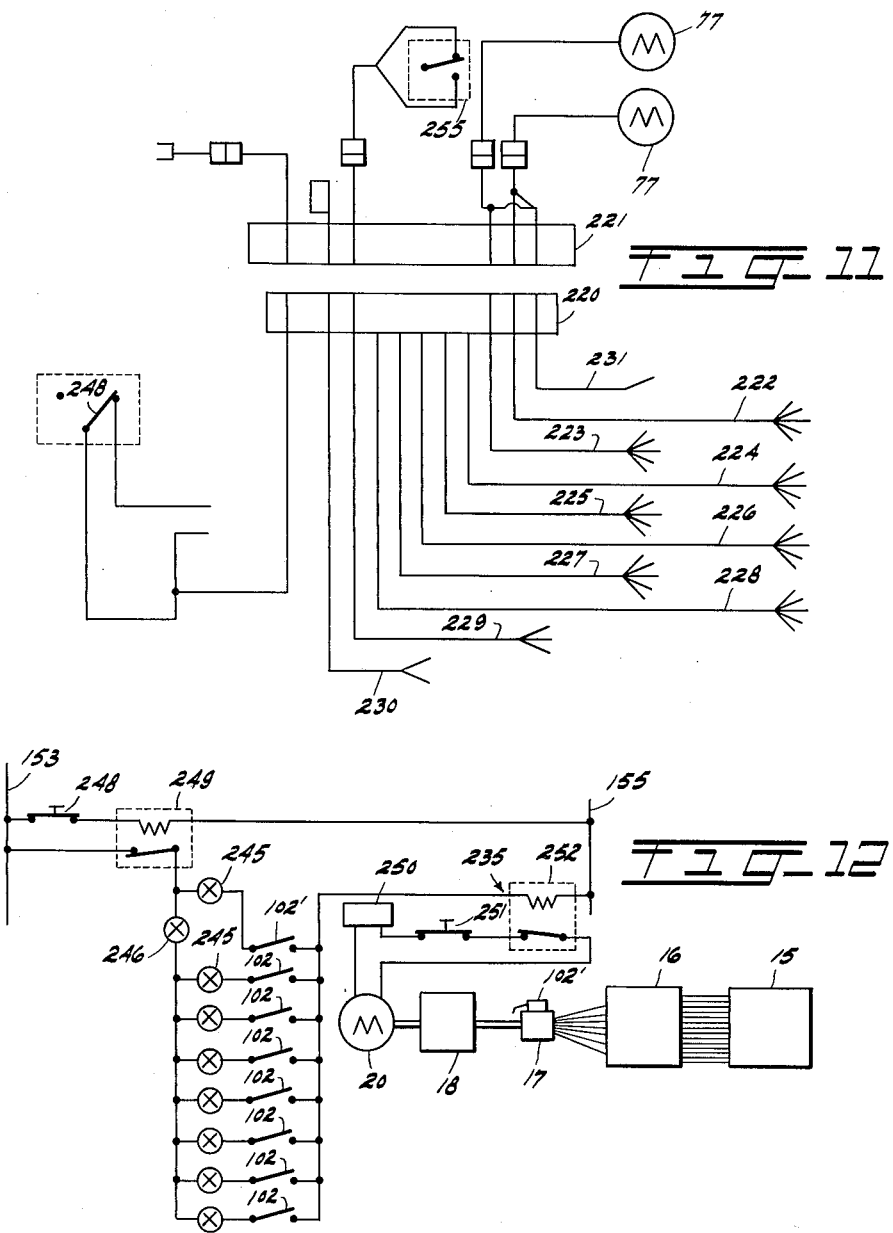

United States Patent Office 3,035,394
Patented May 22, 1962

3,035,394
CONTROL SWITCHES FOR MULTI-UNIT BINDER
Frank Wahl, North Bergen, N.J., assignor to Western Electric Company, Incorporated, New York, N.Y., a corporation of New York
Original application Jan. 30, 1959, Ser. No. 790,230, now Patent No. 2,944,378, dated Jan. 12, 1960. Divided and this application Jan. 18, 1960, Ser. No. 3,059
3 Claims. (Cl. 57—19)

This invention relates to cable manufacturing apparatus, particularly apparatus for forming unit type telephone cable and is a division of the co-pending C. H. Crosby, F. Wahl, R. R. Wahlberg application, Serial No. 790,230, filed January 30, 1959, now Patent No. 2,944,378.

Unit type telephone cables are now being made with only a small number of conductors, such as 25 twisted pairs in each unit and, as more fully explained in patent application of Wililam T. Hicks, Serial No. 782,538, filed December 23, 1958, even these small units in some cases are broken into several groups to more easily obtain a compact cable.

Such cable cannot be manufactured economically by the old procedure, that is, by stranding each unit (or group) separately and then combining them in a cabler since that would involve a large number or strander operations. Combination, strander-cabler machines have therefore been developed to make multi-unit cable from twisted pairs in one operation. In the cables made by such machines "cross talk" between pairs of different units is prevented, by running the pairs of each unit through a unit face plate and oscillating each plate about its own axis to produce a constant variation in the relative positions of the pairs in the adjacent units as they are cabled together.

These new machines make the older separate stranding and cabling machines obsolescent at least for making cables of the smaller sizes.

The object of this invention is an apparatus which makes it possible to manufacture high quality, multi-unit telephone cables from twisted pairs in one operation with existing cablers.

According to the invention, a plurality of oscillable face plates, with individual binding units, suitable controls and driving mechanism, are assembled into a unitary structure for positioning between a telephone wire supply stand and a conventional cabler, to receive the individual twisted pairs, from reels on the stand and combine them into units or groups, in the relative positons they are to occupy in the cable, and guide them through a common binder to the revolving take-up of the cabler.

A feature of the apparatus includes a cradle supporting a plurality of face plates of twist heads apertured to receive groups of conductors and operatively connected to a single power means to rock the heads simultaneously to cause alternate twists in the groups of conductors. A hollow motor driven binding unit for receiving the conductors from each twist head is mounted in the cradle to bind the twisted groups of conductors into units.

Other important features of the apparatus include the electrical and pneumatic controls, some of which are utilized during threading of the conductors through the apparatus while others control the operation of the apparatus, conditioning selected units to function in forming of cables with any number of the groups of conductors, rendering only the selected units effective to stop the apparatus when a binding strand breaks.

Figure 2:
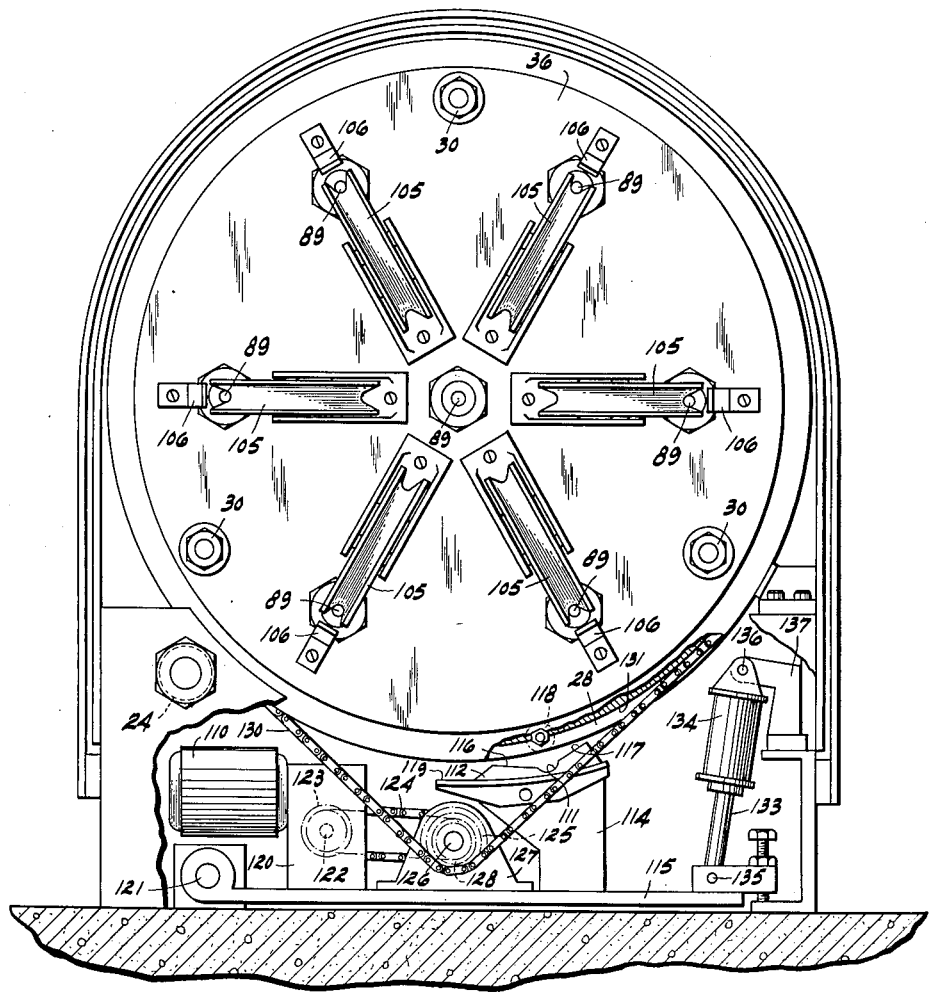
Figure 3:
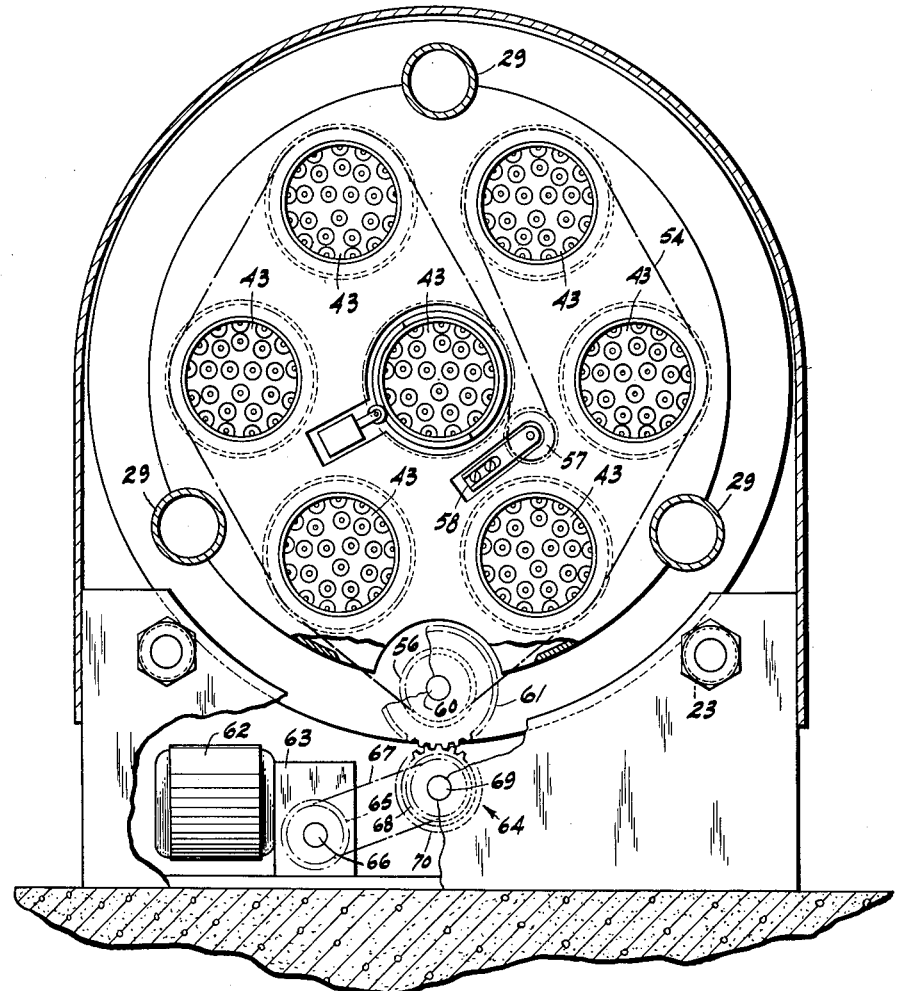
Figure 7:
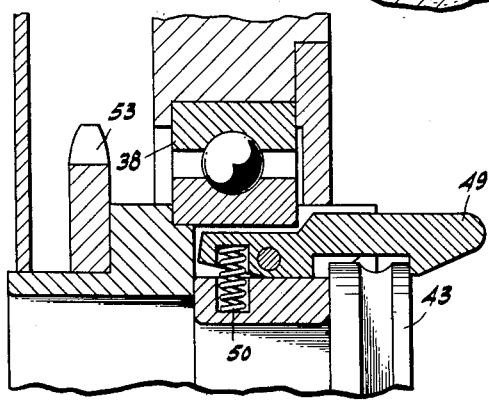

Other objects and advantages will be apparent from the following detailed description when considered in conjunction with the accompanying drawings wherein:

FIG. 1 is a side elevational view of the apparatus, portions thereof being broken away;
FIG. 2 is an end elevational view taken along the line 2—2 of FIG. 1;
FIG. 3 is a vertical sectional view taken along the line 3—3 of FIG. 1;
FIG. 4 is an enlarged front elevational view of one of the twisting heads;
FIG. 5 is a sectional view taken along the line 5—5 of FIG. 4;
FIG. 6 is a sectional view taken along the line 6—6 of FIG. 4;
FIG. 7 is an enlarged fragmentary sectional view taken along the line 7—7 of FIG. 5;
FIG. 8 is an enlarged sectional view of a portion of one of the binding heads;
FIG. 9 is a schematic illustration of a portion of the electrical pneumatic control;
FIG. 10, when placed at the right of FIG. 9, is an additional portion of the electrical pneumatic control;
FIG. 11 is a schematic illustration of the circuits conditioned for function through the numerical operated contact plug;
FIG. 12 is a schematic illustration of the entire apparatus particularly the circuits under the control of the binding heads; and,
FIG. 13 is a fragmentary detailed view of one of the strand control units.

Referring first to FIG. 12, numeral 15 represents a supply unit for supporting numerous reels of conductors, either single or pairs of conductors, to be fed to any desired number of the twisting heads in the cabling apparatus 16. After the conductors leave the apparatus 16 they will pass through a conventional core binding unit 17 and on to a takeup unit 18 which is driven by a main motor 20.

Attention is now directed to FIGS. 1 to 8 inclusive where the apparatus 16 includes a stationary structure 22 including sets of rollers 23, 24 and 25 for rockably supporting a cradle indicated generally at 26. The cradle 26 has parallel disc-like members 27 and 28 secured together in their relatively spaced positions by cylinders 29. The cylinders 29 are secured to the members 27 and 28 by suitable means 30 and continue beyond the member 28 for the left ends are secured to a vertical member 32. Pistons 33 of the cylinders 29 have rods 34 which extend through apertures of the member 32 after leaving their cylinders and have their outer ends secured at 35 to a disc-like member 36. The members 32 and 36 are also parts of the cradle 26.

The member 27 has a central aperture and six additional apertures equally spaced from the central aperture and having bearings 38 mounted therein. The bearings 38 as shown in FIGS. 5 and 6 rotatably support twist heads 40 which are hollow to receive their respective groups of pairs of conductors 41 from the supply 15. Each head 40 is recessed at 42 to removably receive a face plate 43. The face plates 43 are identical in structure with a groove 44 in the periphery thereof to receive a locating pin 45 of each twist head to locate each face plate in a zero or starting position. The face plates are identically apertured and provided with wear resistant bushings 46 through which the pairs of wires 41 travel. Pairs of latches 49, spring pressed as shown at 50 in FIG. 7, are normally urged into holding positions at opposite sides of the face plates in each twist head to secure the face plate into position and to permit it to be removed readily during threading of the apparatus. Some of the twist heads 40 have hand wheels 51 mounted thereon for manual operation of the heads during threading operations. Each twist head 40 has a sprocket 53 fixed thereto, the sprockets being disposed in a common plane to receive a continuous chain 54 shown in FIG. 3. The chain 54 travels in the pass illustrated in FIG. 3 operatively engaging the sprockets 53 and also traveling about a drive sprocket 56 and an idler sprocket 57 to cause like rocking or rotary motions of the twist heads simultaneously and in like directions. The idler sprocket 57 is spring actuated at 58 to hold the chain taut about the sprockets. The drive sprocket 56 is amounted on a shaft 60, supported by the member 27, the shaft also having a gear 61 mounted thereon. The gear 61 is driven by a reversible motor 62 through a speed reducing unit 63 and a driving connection indicated generally at 64. The driving connection includes a sprocket 65 mounted on an output shaft 66 of the unit 63 and a chain 67 driven by the sprocket 65 to drive a sprocket 68 which is mounted on one end of a shaft 69, a gear 70 which interengages the gear 61 being mounted on the other end of the shaft.

A disc-like plate 72 (FIG. 1) interposed between the members 27 and 28 is supported at 73 by the cylinder 29 and has apertures therein aligned with the twist heads 40 through which the groups of wires 41 may pass. Stationary hollow guides 75 receive the groups of wires 41 and guide them through like binding units indicated generally at 76. The binding units 76 and their motors 77 are supported by the member 28 and disposed between the plates 32 and 72 concentric with the guide 75. The guide 75 in each instance extends through not only the motor 77 but also the binding unit 76. One of the binding units is shown more in detail in FIG. 8 and includes a member 79 which is fixed in any suitable manner to the hollow shaft of the motor 77 to be driven thereby. The outer casing of the motor is fixed in any suitable manner to the member 28. The structure identified at 77 as being the motor may in reality be a motor and a gear reduction unit controlling the speed of rotation of the serving head.

The member 79 has an annular cylinder-like portion 80 adapted to receive air under pressure through passageways 81 connected to sources of supply described hereinafter. An annular piston-like member 82 is caused to rotate with the member 79 and is supported for axial movement on bearings 83 under the control of air under pressure in the cylinder 80. A support 85 for a cop 86 of binding material 87 is mounted on bearings 88 to rotate freely as a material 87 is pulled off the cop when being wound spirally on a cable unit 89 formed of the conductors 41. A tube 90 of the cop 86 is held against a shoulder 91 of the support 85 by clamps 92. A brake element 93 fixed to the piston-like member 82 has a tapered surface 94 positioned to engage a cop, 86 as indicated at 95, through the application of air under pressure to the piston-like member 82 apply a braking force to the cop to create a predetermined tension in the material 87. However after approximately half the material 87 has been removed from the cop, the braking effect of the element 93 becomes less efficient and at this time auxiliary braking elements 97 in the form of nylon studs, disposed at spaced positions about the center line of the binding head and mounted in the element 93, are forced against an adjacent surface of the shoulder 91 to apply a brake drag on the support 85 and thereby continue creating the desired tension in the material 87.

The material 87 when leaving the cop 86 extends through an elongate aperture 98 in an outer shell 99 and travels over surface 100 of the shell until it reaches the outer edge thereof from which point it travels to the cable unit 89 where it is wound spirally thereon. Considering both FIGS. 1 and 8, attention is directed to an arm 101 of a switch 102, the arm being constructed and pivotally supported so that, through the aid of a dash-pot 103 slowing the downward movement of the arm, the arm will be held upwardly by the material 87 to hold the switch open as long as the material is being served to the core 89. If the material 87 breaks, the arm 101 will be allowed to move to the dotted position and close the switch 102. The binding unit 17 shown schematically in FIG. 12 is substantially identical to the binding units 76 and has a material controlled switch 102' identical to the switches 102 and influenced by a dash-pot not shown.

The member 36 (FIG. 1) has a guide 104 mounted on the right side thereof for each pair of twist and binding heads to receive the cores 89 moving therefrom. The guides 104 assist in the application of the material 87 to the cable unit in each instance and also function in supporting extra cops 86 of the material 87. The left side of the member 36 supports grooved rollers 105 and guides 106 for all of the cable units 89 with the exception of the center or core unit which is caused to travel in a straight path to the binding unit 17 (FIG. 12) where it is met in advance of the unit 17 by the other cable units and caused to be twisted together into the formation of the final cable by the rotary action of the takeup unit 18.

Some of the important features of the apparatus are the mounting of the stranding means (the twist heads 40) and the cabling means (the binding units 76 and guides 104) in a cradle 26 which can be opened and rocked into various positions to facilitate threading operations in preparing the apparatus for operation. The threading operations always depend upon the type of cable to be produced. The number of cable units in each cable depend largely upon the required number of pairs of conductors. If desired, a single unit cable may be formed using the center twist head 40 and binding unit 76 using also any desired number of the guides 46 in the center twist head. In a similar manner, any desired number of the outer twist heads 40 and companion binding units may be employed using also any desired number of the guides 46 of their face plates, depending upon the numbers of pairs of wires to be included in the selected cable.

When the apparatus is idle, air under pressure may be applied through lines of each cylinder 29 to force the piston 33 to the left, moving the guides 104 with the member 36 to the left, a distance great enough to provide access to the serving heads 76. The rollers 25 are jointly supported by a sleeve 107 and the sleeve is slidably disposed on a rod 108 which is mounted on the support 22. At this time, the cradle may be conditioned to be rocked by a reversible motor 110 (FIG. 2) to impart a rotary movement to the cradle in either direction to bring into position any of the outer binding units and twist heads for threading of the conductors 41 therethrough and for changing or adding new cops to the binding units.

During normal operation of the apparatus, the cradle is locked against rotation by a groove 111 of a cam-like member 112 supported by bracket 114 mounted on a lever 115. The cam-like member 112 has tapered surfaces 116 and 117 positioned to engage a roller 118 supported at the inner side of the member 28 to cause the roller to terminate in the recess 111 to lock the cradle, at what may be described as a zero or normal operating position. A brake element 119 mounted on the bracket 114 is positioned to engage the periphery of the member 28 during any position of the cradle, with the exception of that in which the roller is positioned to engage the element 112, the brake serving to stop and hold the cradle in any selected threading position. The motor 110 and a companion speed reducing unit 120 therefor are mounted on the lever 115, the lever being pivotally supported at 121. An output shaft 122 of the unit 120 has a sprocket 123 mounted thereon and a chain 124 connects the sprocket operatively to an inner sprocket 125 mounted on a shaft 126. The shaft 126 is journaled in suitable bearings of a bracket 127 mounted on the lever 115 and has a sprocket 128 mounted thereon. A chain 130, lying in an annular groove 131 of the member 28, interengages the sprocket 128 and as a connection for the power means 110—120 to drive the cradle in either direction when the lever 115 is in the down position shown in FIG. 2. A piston rod 133 of an air cylinder 134 has its lower end connected at 135 to the free end of the lever 115 while the cylinder is pivotally supported at 136 by a fixed bracket 137. The air cylinder 134 is operated at predetermined intervals selectively to cause driving connection with power means for rocking the cradle when the lever 115 is in its down position and to stop the cradle at any selected position including the zero position when the lever is in its up position.

Electro-Pneumatic Controls

Attention is directed to the controlling means for the apparatus shown in combined FIGS. 9 and 10 and in FIGS. 11 and 12. At the top center of FIG. 9, a unit 140 receives air under a controlled pressure from a supply means 141 and directs the air through lines 142 in any suitable manner to the cylinders 80 (FIG. 8) of the various binding units. A fluid line 143 connects the unit 140 to the supply line 144 extending from the supply means 141. A constant pressure regulating valve 145 and a check valve 146 in addition to a solenoid valve 147 are mounted in a line 143. An auxiliary line 148 extends from the supply line 144 to the line 143 and has a constant pressure control valve 150 and a solenoid valve 151 mounted therein. The solenoid valve 147, although shown open, is normally closed while the solenoid valve 151 although shown closed, is normally opened. At the start of the operation of the apparatus, a normally opened switch 152 is closed completing a circuit from line 153 through winding 154 of solenoid valve 151 to line 155 energizing valve 151 into the closed position shown. At the same time, a circuit is completed through a time delay switch 156 which is actuated into the closed position shown after a predetermined time interval allowing solenoid 151 to close after which winding 157 will move solenoid valve 147 into the opened position shown, opening line 143 to unit 140 for the air under controlled pressure to pass to the binding units.

The air cylinder 29 of FIG. 9, representing all of the air cylinders 29 of the cradle, is manually controlled by a double throw switch 158 to selectively energize windings 159 and 160 of solenoid valve 161. The valve 161 is mounted between lines 162 and 163 on one side, leading to opposite ends of the cylinder 29, a supply line 164 and an exhaust line 165 on the opposite sides thereof. The supply line 164 is connected at 166 to the supply line 144 through a constant pressure regulating valve 167. The winding 159 of the solenoid valve 161 when energized moves the valve into the position shown causing the air under pressure to move the piston 33 to the right to close the cradle FIG. 1 to move the guides 104 into the positions shown in that figure. When the winding 160 is energized, the portion 168 of the valve will be aligned with the fluid lines connecting lines 162—165 and 163—164 reversing the directions of flow of the fluid under pressure and the exhausting of the air from the cylinder to move the piston to the left to open the cradle.

The valve 167 controls air under pressure to supply line 170 for the air cylinder 134, FIGS. 2 and 9, which has lines 171 and 172 leading therefrom at opposite ends of the cylinder to a solenoid valve 173. The valve 173 controls the flow of the air under pressure through either line 171 or 172 to the cylinder and from the cylinder through an exhaust line 174. The valve 173 is in its normal position urged into that position by a spring 175 to connect line 171 with the supply 170 to force the piston upwardly and to connect line 172 at the top of the air cylinder 134 to the exhaust line 174. A winding 176 of the solenoid valve 173 is under the control of normally open switches 177 and 178 in a circuit extending from line 153 to line 155. Windings 181 and 182 for the switches 177 and 178 are under the control of cradle moving means originating with the motor 110. The motor 110 is of the reversible type shown in FIGS. 2 and 9 and receives its electrical energy from a source 184. The schematic illustration of the motor circuit includes positive lines 185 and 186 when respectively joined with a negative line 187 through a normally open double acting switch 188 will cause energization of the motor in their respective opposite directions. Winding 189 when energized will cause closing of the bottom contacts of the switch 188 whereas energization of winding 190 will cause closing of the top contacts.

Attention is now directed to a series of limit switches at the bottom of FIG. 9 indicated at 191, 192, 193, and 194. The switches 191 to 194, inclusive, are mounted with respect to the member 28 of the cradle and are provided with conventional rollers on their outwardly projecting arms to be engaged an operated by suitable cams. In the present instance, a can 196 mounted on one side of the member 28 has its ends posiitioned to respectively engage and operate the switches 191 and 192 to stop the rotating means by de-energizing the motor 110. In other words, the switches 191 and 192 limit the rocking motions of the cradle in their respective directions. The limit switches 193 and 194 have their respective cams 198 and 199 mounted on the other side or face of the member 28 to assist in returning the cradle to its zero position.

Manually operable switches 200, 201, and 202 in the lower portion of FIG. 9 are identified respectively as zero, left hand up and right hand up switches. These titles indicate the actions on the cradle 26 after the downward movement of the respective switches. The switches are shown in their normal positions closing their top contacts. If the cradle is to be rotated to move the left hand side thereof up, switches 201 is pressed to open its top contacts and close its bottom contacts. Regardless of which of the three switches 200, 201 or 202 is operated, a circuit is completed through the winding 176 of valve 173 to move the valve from the normal position shown to its operated position to cause the air cylinder 134 to move the lever 115 downwardly to free the cradle for rotation and to connect the driving means 128—130 (FIG. 2) for the motor 110. Returning to the manually pressed switch 201, the left hand bottom contacts complete a circuit from line 153 through winding 181 to line 155 closing switch 177 to energize winding 176 of solenoid valve 173. The right hand bottom contacts of switch 201 complete a circuit from line 153 through said contacts from connection 205, normally closed switch 192, winding 190 of switch unit 188 to line 155. This will energize the motor 110 in a direction to rotate the cradle clockwise (FIG. 9), that is, to move the left hand side thereof up until either switch 201 is freed to return to its normal up position or until cam 196 engages the roller of switch 192 to open the switch and de-energizes the winding 190. The switch unit 188 returns to its neutral or center open position de-energizing the motor 110. When the switch 201 is released and returned to its top contacts, winding 181 is de-energized, switch 177 opens, winding 176 de-energizes and valve 173 returns to its normal position causing operation of the air cylinder 134 to move the lever 115 to disconnect the drive means 128—130 from the motor 110 and to stop rotation of the cradle.

Manual actuation of switch 202 from its top contacts to its bottom contacts accomplishes a similar result, the difference being in the direction of rotation of the cradle, moving the right hand side of the cradle up. The bottom left contacts of switch 202 energize winding 181 to effect operation of valve 173 and air cylinder 134 to move the lever 115 downwardly to free the cradle for rocking movement and connect the driving means 128—130 for the motor 110. Closing of the bottom right contacts of switch 202 completes a circuit from line 153 through said contacts, through normally closed switch 191 and winding 189 of switch unit 188 to line 155. This operation of switch unit 188 causes driving of the motor 110 in a direction to move the cradle counterclockwise, to move the right hand side up until switch 202 is opened manually or until cam 196 opens switch 191.

Regardless of the position of the cradle, when the apparatus has been threaded for the next operating period, manual actuation of the zero switch 200 will return the cradle to its zero position. Movement of switch 200 to its down position, closing its bottom contacts completes two circuits, the first extending from line 153 through winding 182 to line 155, to close switch 178, energize winding 176 of valve 173 to cause downward movement of the lever 115 to free the cradle for rocking movement and to connect the motor 110 with its drive means 128—130. The second circuit is completed through one of the switches 193 or 194. These switches are positioned with respect to their cams 198 and 199 so that when the cradle is in its zero position, both switches will be open and when the cradle is moved in either direction from the zero position one of the cams 198 or 199 leaves its switch freeing it to close a circuit. When this occurs, a circuit will be completed from line 153 through the bottom contacts of switch 200, top contacts of switch 201 and 202 through the closed switch 193 or 194 and through one or the other windings 189 or 190 controlling the direction of rotation of the motor 110 to return the cradle to its zero position. For example, if the left hand side of the cradle is up, freeing the switch 193 to close the aforementioned circuit, after leaving the top contacts of switch 202 will extend through closed switch 193, closed switch 192, winding 190 to line 155. The motor 110 will be driven in a direction to rotate the cradle counterclockwise until cam 198 opens switch 193, de-energizing motor 110 and effecting stopping of the cradle at the zero position. A similar action takes place to rock the cradle clockwise to return it to its zero position using, however, switches 194, 191 and winding 189.

FIG. 10 illustrates another portion of the control circuits combined with those of FIG. 9 including a circuit from line 153 FIG. 9, at connection 205 through closed left contacts of switches 201 and 202, through closed switch 206, winding 207, of time delay switch 208, connection 209, and to line 155 of FIG. 9 at connection 210. Switch 206 has a roller type projection 211 positioned to ride on the periphery of member 27 and receivable in a recess 212 when the cradle is in its zero position. The time delay switch 208 is set for closing after a predetermined length of time which is needed to permit rocking movements of the cradle to selected positions for threading of the apparatus, a number of these movements permitting temporary or momentary closing of switch 206 by the roller member 211 entering in the recess 212. However, it is not until the apparatus is threaded and sufficient time elapses after the return of the cradle to its zero position that switch 208 is closed to cause energization of winding 214 of solenoid valve 215 into the position shown where air under pressure from a supply 216 will travel to the bottom of an air cylinder 217, forcing the piston 218 upwardly while at the same time, air above the piston will be exhausted through line 219. When the winding 214 is de-energized, the direction of flow of the air under pressure is reversed to force the piston 218 downwardly in the air cylinder 217. The piston 218 carries a multiple contact plug 220 for interengagement of its contacts with contacts of a socket 221 supported by the cradle and aligned with the plug when the cradle is in its zero position. The plug 220 and the socket 221 are shown schematically in FIG. 11 where single lines 222, 223, 224, 225, 226, 227 and 228 represent multi-conductor units for motors 77 of the seven binding units, line 229 represents three conductors for the oscillating motor 62, line 230 represents conductors for a safety feature and line 231 is common to all motors.

FIG. 12 illustrates a control circuit indicated generally at 235 which is responsive to any or all of the switches 102—202' shown in FIGS. 1, 12 and 13. The switches are shown schematically as simple contact switches in FIG. 12 but actually they are mercury switches of the type shown at 236, held in a bracket 237 on a rockable support 238. The support 238 is mounted on a pivot 239 and has an arm 240 fixed thereto with a curved outer end 241 positioned to be engaged intermittently by the binding material 87 from its respective binding unit. A lever 242 fixed to the support 238 is connected to a movable portion 243 of its dash-pot 103, this unit serving as means to retard movement of the support 238 and arm 240 to move the switch 236 into its closed position where it will be allowed to move if the material 87 pays out or breaks.

Each switch 102 of the seven binding units in the cradle and the switch 102' of the binding unit 17 have switches 245 selectively including their switches 102 or 102' in the control circuit 235 if their binding units are being used or, to exclude their switches from the control circuit, if their binding units are not being used. Another switch 246 may be opened to exclude all of the switches 102 if only a single core unit is being formed. A manually operable switch 248 adapted for operation when the cradle is idle may be closed just prior to starting an operating cycle of the apparatus to complete a circuit through a time delay switch 249 in a circuit between lines 153 and 155. The switch 249 delays closing of the control circuit 235 until motor 20 is at full speed at which time switch 249 is closed, placing the control circuit 235 under the control of all of the switches 102—102' which have been made active through closing of their switches 245. While the apparatus is in operation and the binding materials 87 continue their rapid turns on the cable units, the control circuit 235 will remain open allowing continued energization of the motor 20 to advance the strands through the operation of the takeup 18. The circuit for the motor 20 is shown schematically in FIG. 12 as receiving its electrical energy from a source 250 and including a manually operable switch 251 and a time delay switch 252. The winding of the time delay switch is in the circuit 235 which will remain inactive until one of the switches 102 or 102' is allowed to operate into closed position through breaking of the material. At that time, after a predetermined time delay, switch 252 will operate to open the circuit to motor 20.

*Operation*

The twist heads and the binding units, together with the guides 104 assisting the binding units, are mounted in the cradle 26 which may be opened readily for the threading of the conductors through the apparatus and at the same time, the cradle may be rocked in either direction to position the sets of strand receiving portions of the apparatus convenient for the threading of the conductors therethrough. During the threading operation, the plug 220, FIGS. 10 and 11, initially disposed externally of the cable, is removed from the socket 221 supported by the cradle. Through the aid of the switches 201 and 202 of FIG. 9, the cradle may be rocked in either direction energizing the rocking motor 110. At the same time, valve 173 is operated to release the brake or holding means for the cradle and the driving means 128—130 is operatively connected to the motor 110. After each rocking motion is imparted to the cradle and the motor 110 is de-energized, valve 173 will be actuated automatically to return the holding means to the cradle, holding the cradle in its adjusted position and disconnecting the driving means of the motor 110. These operations continue until the desired number of conductors have been threaded through the desired number of guides 46 of the face plates of the twisting heads 40 which are to be used, and also, through their respective binding units 76, their guides 104 and on through the core binder 17 to the takeup 18. The binding materials 87 of the units 76 and 17 are secured to the cable units 89 and to the cable core beyond the binding units 17.

At this time, the cradle is ready to be returned to its zero position by actuating the switch 200 (FIG. 9). Regardless of the position of the cradle, during actuation of the zero switch 200, circuits will be completed to cause energization of the motor 110, after its connection has been completed through operation of the valve 173, to rotate the cradle in a direction to return to its zero position. At this time, roller 118 (FIG. 2) enters recess 111 and roller 211 (FIG. 10) enters the recess 212 of the member 27 of the cradle closing a circuit including winding 207 of time delay switch 208. After a predetermined interval of time controlled by the setting of the switch 208, this switch will close, energizing winding 214 of the valve 215, operating the valve into the position shown and holding it in this position. Piston 218 of the air cylinder 217 will be moved upwardly to cause interengagement of the plug 220 with the socket 221 and complete electrical connections of the various electrically operable means in the cradle including particularly the motors 62 and 77. The oscillating motor 62, when energized, is under the control of an oscillating reversing switch unit 255 which brings about rocking of the twist heads as shown in FIG. 3. During the time relay of the switch 208 to cause interengagement of the plug 220 with the socket 221, switch 160 may be operated to move the valve 163 (FIG. 9) into the position shown to operate the air cylinders 29 particularly the pistons 33 thereof to move the member 36 of the cradle into the closed operating position shown in FIG. 1.

The apparatus is ready for operation after closing main switch 152 to operate valve 151 and subsequently through time delay switch 156 to operate valve 147 to direct the fluid under control pressure from unit 140 to the various brake elements of the binding units. Closing of switches 251 and 248 complete the starting means for the apparatus. The apparatus continues in its operation until it is desirable to stop it for feeding new cops 86 to the binding heads, until the desired length of cable has been formed or until any strand 87 breaks. The result of the latter results in its switch 102 or 102' closing the control circuit 235, to operate the time delay switch 252, to open the circuit to the motor 20 and stop the apparatus. The common connection 231 with all of the motors results in stopping of their rotation, upon de-energization of the motor 20.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with a binding unit operable to wrap successive turns of binding material on an advancing core, of a circuit controlling the advancement of the core, a mercury switch for the circuit, a rockable support for the mercury switch mounted for movement of the mercury switch between a normally closed position and an open position adjacent the binding unit, and an arm fixed to the support and positioned to be engaged by the successive turns of the material and be successively moved thereby to move the support with the switch into the open position.

2. The combination according to claim 1 in which a unit connected to the rockable support retards movement of the support to move the switch toward and closed position to render the arm responsive to uninterrupted successive turns of the material to keep the switch open until the successive turns discontinue.

3. In an operable cabling apparatus, a mercury switch normally closable to render the apparatus unoperable, a rockable arm for supporting the switch positioned to be engaged by successive wrapping motions of a strand about a longitudinally advancing cable portion to move the switch open, and a dash-pot unit retarding the closing motion of the switch so that the switch will be held open by the successive wrapping motions of the strand until the strand breaks.

References Cited in the file of this patent

UNITED STATES PATENTS

| | | |
|---|---|---|
| 2,003,353 | Fantone et al. | June 4, 1935 |
| 2,128,476 | Runton | Aug. 30, 1938 |
| 2,430,893 | Todd | Nov. 18, 1947 |
| 2,685,626 | Zwack | Aug. 3, 1954 |
| 2,876,615 | Turner | Mar. 10, 1959 |
| 2,944,378 | Crosby et al. | July 12, 1960 |

FOREIGN PATENTS

| | | |
|---|---|---|
| 945,710 | France | Dec. 6, 1948 |